United States Patent
Zhang et al.

(10) Patent No.: US 7,539,162 B2
(45) Date of Patent: May 26, 2009

(54) WALSH CODE MANAGEMENT IN A CODE DIVISION MULTIPLE ACCESS CELLULAR WIRELESS COMMUNICATION SYSTEM

(75) Inventors: Chang-Gang Zhang, Plano, TX (US); Farhad Bassirat, Plano, TX (US); Martin Kendall, Wylie, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 869 days.

(21) Appl. No.: 10/035,846

(22) Filed: Dec. 24, 2001

(65) Prior Publication Data

US 2005/0041612 A1 Feb. 24, 2005

(51) Int. Cl.
 *H04W 4/00* (2006.01)
(52) U.S. Cl. .................................. 370/331; 370/342
(58) Field of Classification Search .................. None
 See application file for complete search history.

(56) References Cited

U.S. PATENT DOCUMENTS

| | | | | |
|---|---|---|---|---|
| 5,933,777 | A * | 8/1999 | Rahman | 455/450 |
| 6,078,817 | A | 6/2000 | Rahman | |
| 6,160,798 | A | 12/2000 | Reed et al. | |
| 6,754,493 | B1 * | 6/2004 | Jetzek | 455/436 |
| 2001/0051520 | A1 * | 12/2001 | Johansson et al. | 455/423 |
| 2005/0221828 | A1 * | 10/2005 | Wakuta et al. | 455/437 |

FOREIGN PATENT DOCUMENTS

| | | |
|---|---|---|
| EP | 1 134 994 A1 | 9/2001 |
| EP | 1 179 961 A1 | 2/2002 |

* cited by examiner

*Primary Examiner*—Ricky Ngo
*Assistant Examiner*—Rhonda Murphy
(74) *Attorney, Agent, or Firm*—Garlick Harrison & Markison; James A. Harrison; Kevin L. Smith (57) ABSTRACT

A cellular wireless communication system and method of operation manages Walsh codes in order to ensure that sufficient Walsh codes are available to prevent call blocking and to support additional hand-off operations. In an initial operating condition, the cellular wireless communication system services normal hand-off operations in which a maximum number of cells and sectors may participate in hand-off. With hand-off operations according to the present invention, each cell or sector participating in hand-off for a mobile terminal uses a unique Walsh code for covering its forward link signals. When the number of Walsh codes available for servicing new calls is reduced so that it meets or exceeds a Walsh code availability threshold, the number of cells and sectors that may participate in hand-off is reduced from the maximum number. In the number of participating cells/sectors results in release or non-use of some Walsh codes. In subsequent operations when sufficient Walsh codes are available for servicing hand-off operations, a greater number, up to the maximum number of cells and sectors may again participate in hand-off of the mobile terminal.

10 Claims, 5 Drawing Sheets

WALSH CODE MANAGEMENT IN A CODE DIVISION MULTIPLE ACCESS CELLULAR WIRELESS COMMUNICATION SYSTEM

BACKGROUND

1. Technical Field

The present invention relates generally to wireless communications; and more particularly to Code Division Multiple Access (CDMA) cellular wireless communication systems.

2. Related Art

Cellular wireless communication systems are well known. In a cellular wireless communication system a plurality of base stations provide wireless coverage within respective cells that includes respective pluralities of sectors. In aggregation, the base stations work together to support wireless communications within a service area. The base stations are coupled via at least one Base Station Controller (BSC) to a mobile switching center (MSC). The MSC couples to the Public Switched Telephone Network (PSTN) and services voice traffic for all serviced mobile terminals. For the service of packetized communication, e.g., between mobile terminals and the Internet, a packet data link between the BSC and one or more packet data networks is provided.

Various cellular operating standards exist. These cellular standards include, for example, the Advanced Mobile Phone System (AMPS) standards, the Narrowband Advanced Mobile Phone Service (NAMPS) standards, the Global Standards for Mobile Communications (GSM) standards, the Code Division Multiple Access (CDMA) standards, and the Time Division Multiple Access (TDMA) standards among others. These cellular standards are continually improved and updated to service ever increasing cellular wireless communication system demands. Currently, various CDMA systems are deployed, e.g., IS-95A and IS-95B, and additional CDMA systems are planned for deployment, e.g., 1xRTT, 1xEV-DO, etc.

CDMA systems are direct sequence spread spectrum systems in which a plurality of spread-spectrum signals are transmitted simultaneously in the same frequency band, both on forward links from base stations to mobile terminals and on reverse links from the mobile terminals to the base stations. Each intended mobile terminal is assigned at least one distinct Walsh code that identifies the signals sent to, or received from mobile terminal. Of a plurality of forward link spread-spectrum signals intended for a respective plurality of mobile terminals, each is covered by a respective Walsh code. For example, forward link signals intended for a first mobile terminal are covered by a first Walsh code, $g_1(t)$, and forward link signals intended for a second mobile terminal are covered by a second Walsh code, $g_2(t)$, etc. Each mobile terminal receives a composite spread spectrum signals within the shared frequency band at its antenna, such composite signal including energy intended for all serviced mobile terminals. However, after despreading the received signal with its assigned Walsh code, the receiver of the mobile terminal outputs all the energy of its intended signal but only a small fraction of the energy of signals intended for other mobile terminals. Thus, the signals intended for the mobile terminal may be extracted from the received composite signal by using the assigned Walsh code.

CDMA capacity is interference limited. The number of mobile terminals that may be supported within a particular area is determined by the total interference power that all of the mobile terminals, taken as a whole, generate. The number of mobile terminals that may be supported by each base station is limited because the base station can provide only a maximum power output within its respective cell or sectors that must be divided among the mobile terminals operating within the respective cell or sectors. Thus, as the number of mobile terminals operating within a cell increases, the additional amount of power available for new mobile terminals decreases until a minimal level is reached and a maximum number of users have been reached for the cell or sector. Dividing the power in such a fashion sometimes results in dropped calls due to the signal strength going below a required threshold.

To minimize the dropped call probability and to improve call quality, a mobile terminal typically receives forward link signals from more than one base station and/or from more than one sector of a particular base station, particularly when the mobile terminal is moving from sector to cell or sector to cell. A "rake receiver" of the mobile terminal receives and decodes a plurality of forward link signals and thus can receive and decode these multiple forward link signals. An operation during which a mobile terminal is moving between cells and sectors is commonly referred to as "hand-off." Hand-off between base stations is generally referred to as "soft hand-off" while hand-off between sectors of a single base station is generally referred to as "softer hand-off." Mobile terminals continually measure the strength of pilot signals received from cells and/or sectors and report these measurements to the wireless network via a servicing base station. Based upon the reported strengths of these pilot signals, the wireless network then initiates, services, and terminates forward link signals in respective cells/sectors based upon the measurements.

Note however, that a mobile terminal that is stationary will typically also receive forward link transmissions from a plurality of cells and/or sectors even though in some cases a single forward link will service a corresponding mobile terminal. Multiple forward link transmissions to a single mobile terminal may be established even when the mobile terminal initially receives service. During call setup, the wireless network infrastructure typically determines a sector that initially services the mobile terminal. Then, resources are allocated within the base station that services a corresponding forward link and forward link transmissions are initiated within the sector (or cell).

An initially servicing forward link is typically the strongest forward link and is referred to as the "primary" forward link. Weaker forward links that may be enabled during hand-off are typically referred to as "secondary" forward links. When multiple forward links are operational, a serviced mobile terminal obeys directives from the primary forward link, e.g., reverse link power control directives.

In newer CDMA systems, improved Coder DECoder (CODEC) technologies allow voice communications to be supported at lower data rates. Further, improvements in physical layer modulation schemes, Forward Error Coding, and other operations also support lower data rate operations. Because of these technological increases, a greater number of users may be supported within each cell/sector before CDMA interference limitations are reached. For example, in systems using Enhanced Variable Rate CODEC (EVRC) operations, on average, up to 24 users per sector may be supported on each carrier. Further, in 1xRTT systems, on average, up to 30 users per sector may be supported on each carrier.

In a typical IS-95A or IS-95B system, 64 Walsh codes are available for use but at least three Walsh codes are dedicated for use with overhead channels. In IS-2000 systems either 64 or 128 Walsh codes are available, depending upon the implementation, with some of these also dedicated to overhead channels. During operation in which an average of 24 users is supported and with which each user is in hand-off with in average of 2.5 sectors a total of 64 Walsh codes would be required. This operational example would fully deplete the available Walsh codes if 64 Walsh codes were available. When all Walsh codes are used for servicing calls for a set of mobile terminals, new call setup and new hand-offs are blocked.

Thus, there exits a need in the art for a cellular wireless communication system having improved performance during hand-off and call setup.

SUMMARY OF THE INVENTION

In order to overcome the above-described shortcomings, as well as other shortcomings of the prior systems and operations, a cellular wireless communication system constructed and operating according to the present invention manages Walsh codes in order to ensure that sufficient Walsh codes are available to prevent call blocking and to support additional critical hand-off operations. In an initial operating condition, the cellular wireless communication system services normal hand-off operations in which a maximum number of cells and sectors may provide forward link transmissions. With the operations of the present invention, each cell or sector participating in hand-off for a mobile terminal uses a unique Walsh code for covering its forward link signals.

However, during some points in operation, the number of available Walsh codes will be reduced until a Walsh code availability threshold is met, i.e., the number of available Walsh codes is less than the Walsh code availability threshold. When this occurs, the number of forward link transmissions that may be used for each hand-off is reduced from the maximum number to a lesser number, e.g., four or five. A forced reduction in the number of links per call results in the release or non-use of some Walsh codes. In subsequent operations when sufficient Walsh codes are available for servicing hand-offs, a greater number of cells and sectors may again participate in hand-off for each serviced mobile terminal. Note that some cells/sectors may reach a Walsh code availability threshold while others have not. In such case, hand-off operations are limited in some cells/sectors but not in other cells/sectors.

In a particular operation according to the present invention, base stations (and Base Station Transceiving Subsystems "BTSs" located therein) and Base station Controllers (BSCs) operate according to the present invention to limit the number of participating cells/sectors during hand-off. During normal operations, up to six-way hand-off is supported. When the number of available Walsh codes reaches a Walsh code availability threshold, six-way hand-off is precluded. In such case, for any six-way hand-offs, a weakest forward link of the six-way hand-off is terminated and the corresponding Walsh code is released. In a similar operation, both five-way and six-way hand-off operations are terminated. Thus, when six-way and five-way hand-off operations are precluded at most four-way handoff is allowed.

With a cellular wireless communication system servicing Enhanced Variable Rate CODEC (EVRC) and other relatively lower data rate operations, the present invention yields significant benefits. By limiting hand-off operations to ensure the availability of Walsh codes, call blocking is minimized or reduced and critical hand-off operations may be serviced. Further, because only the weakest links are eliminated, little benefit is lost. Such is the case because the mobile terminals typically only receive and decode the three strongest forward link signals. Thus, the weaker links provide no significant benefit. Other aspects of the present invention will become apparent with further reference to the drawings and specification that follow.

BRIEF DESCRIPTION OF THE DRAWINGS

A better understanding of the present invention can be obtained when the following detailed description is considered in conjunction with the following drawings, in which.

DETAILED DESCRIPTION OF THE DRAWINGS

Figure 1:
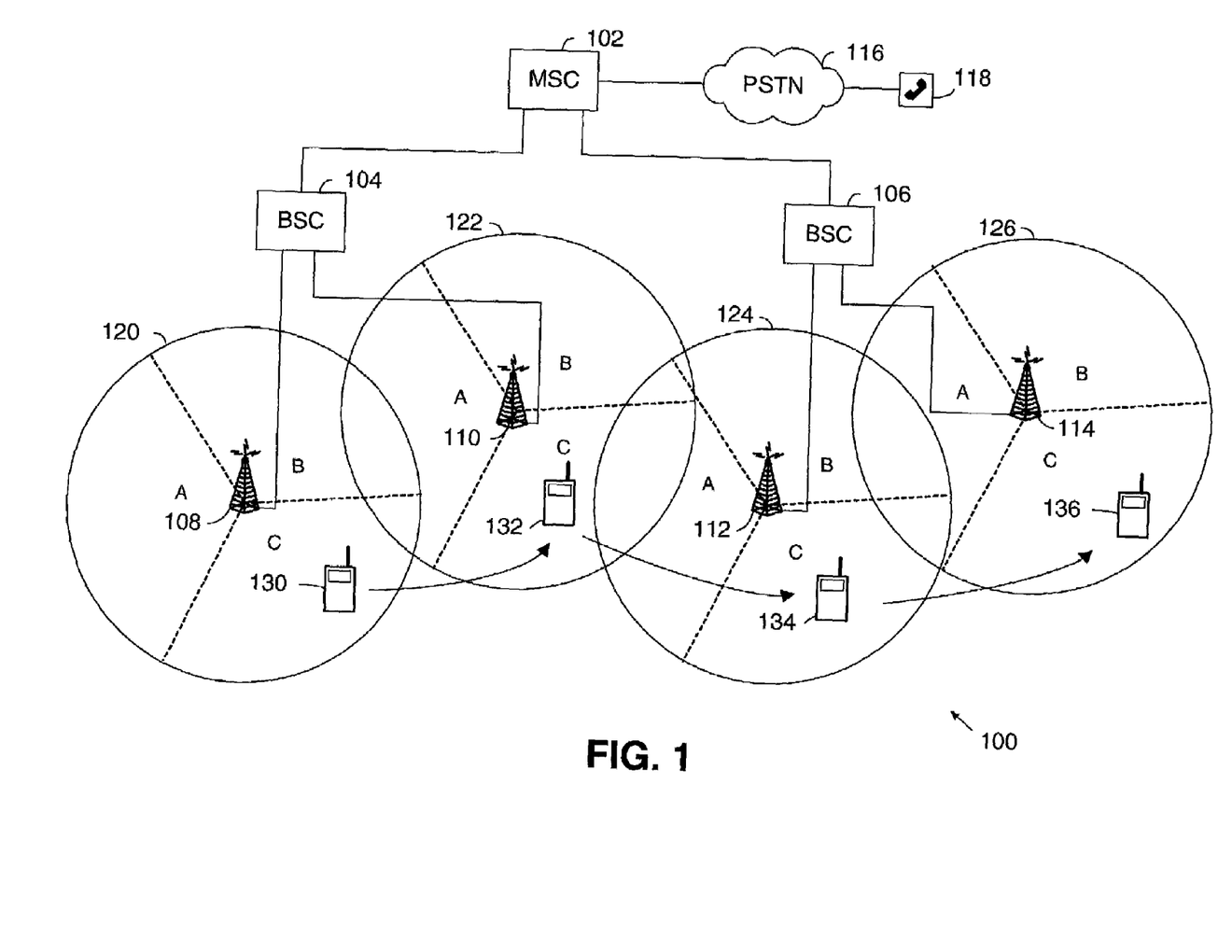
FIG. 1 is a system diagram illustrating a cellular wireless communication system in which Walsh code allocation and use is dynamically managed according to the present invention.

FIG. 1 is a system diagram illustrating a cellular wireless communication system 100 in which Walsh code allocation and use is dynamically managed according to the present invention. The cellular wireless communication system 100 includes a mobile switching center (MSC) 102, Base Station Controllers (BSCs) 104 and 106, and a plurality of base stations 108, 110, 112, and 114 coupled to the MSC 102 via respective BSCs. Together, these components are referred to as the "wireless network." Each of the base stations 108 through 114 provides wireless coverage within a plurality of sectors that make up respective cells. For example, base station 108 provides wireless coverage within three sectors (sectors A, B, and C) of cell 120, each of which spans 120 angular degrees about base station 108. Base stations 110, 112, and 114 provide wireless coverage within cells 122, 124, and 126, each having a respective set of three sectors.

The public switched telephone network 116 (PSTN) couples to MSC 102. With the base stations 108 through 114 providing wireless communications within the service area, a mobile terminal (shown at positions 130, 132, 134, and 136) may establish a call with a telephone 118 connected to the PSTN 116 or with other wireless mobile terminals operating within this or another service area. While the present invention is described with reference to a single mobile terminal and with voice service, the teachings of the present invention apply equally well to data operations and with multiple mobile terminals.

The mobile terminal initiates a phone call while at position 130 and moves in from position 130 to positions 132, 134, and 136, in order. At position 130 within sector C of cell 120, serviced by base station 108, the mobile terminal initiates a call to telephone 118. The wireless network receives a call setup request from the mobile terminal and allocates forward link and reverse link resources for servicing the call in a corresponding sector. Upon call completion, the cellular wireless communication system 100 services the call between the mobile terminal and telephone 118 using a path that includes a wireless link between the mobile terminal and base station 108, a wired path between base station 108 and the PSTN 116 (via BSC 104 and MSC 102), and via the PSTN 116.

In initial call setup and service, the wireless communication system allocates resources in sector C of cell 120, i.e., the primary link. Thus, a single Walsh code is allocated for the forward link signals from base station 108 to the mobile terminal at position 130. Note that the present invention concerns forward link signals only and the manner in which the forward link signals are serviced and managed. Thus, in describing the present invention, only forward link operations are considered and the reader should understand that reverse link operations are also required for servicing the phone call between the mobile terminal and the telephone 118.

In the described embodiment, the mobile terminal continuously scans for pilot signals transmitted from the base stations 108-114, measures the strengths of such pilot signals, and upon meeting predetermined criteria, reports the strengths and identities of the pilot signals to the network infrastructure. Information regarding the strength of pilot signals, as measured by the mobile terminal, is of significance for hand-off operations. Thus, prior to initiating the call, the mobile terminal received pilot signals from the sectors serviced by base stations 108-114, measured the strengths of these pilot signals, and reported the strengths and identities of the pilot signals to the wireless network via a servicing base station, e.g., base station 108. Based upon the pilot signal strengths and identities reported, the wireless network determined that forward link signals should be transmitted only in sector C of cell 120.

When the mobile terminal moves from position to 130 to position 132 hand-off operations are performed. During hand-off, the wireless network commences transmission of forward link signals within additional sectors. For example, while moving from position 130 to position 132, base station 108 transmits forward link signals to the mobile terminal in both sectors B and C and base station 110 transmits forward link signals in both sector A and sector C. This particular operation includes soft hand-off between cells 120 and 122, softer hand-off between sectors C and B of cell 120, and softer hand-off between sectors A and C of cell 122. This particular hand-off operation is a four-way hand-off operation because four forward link signals are involved. According to the present invention, each of these forward link signals is covered by a unique Walsh code. Thus, during this hand-off operation, four unique Walsh codes are used for a single hand-off operation of the mobile terminal.

When the mobile terminal moves from position 132 to position 134, sectors B and C of cell 122 and sectors A, B, and C of cell 124 participate in the hand-off. This hand-off operation is a five-way handoff operation in which five unique Walsh codes are employed. When the mobile terminal moves from position 134 to position 136, sectors A, B, and C of cell 124 and sectors A, B, and C of cell 126 participate in hand-off. This hand-off operation is a six-way handoff operation in which six unique Walsh codes are employed.

In an initial operation according to the present invention, up to six-way hand-off is supported, as required by some operating standards. However, when a number of available Walsh codes compares unfavorably to a threshold, e.g., is less than a Walsh code availability threshold, hand-off operations are limited. In one particular operation according to the present invention, when a Walsh code availability threshold is met, hand-off is limited to at most four-ways.

Thus, five-way and six-way hand-off operations are prohibited. In prohibiting five-way and six-way hand-off, any mobile terminals that are being handed off will not be serviced by more than four forward links. For those mobile terminals participating in five-way or six-way handoff, one or two forward link signals are terminated, respectively. Further, all new hand-offs will be limited to a corresponding number of forward links, i.e., four-way. A determination as to which forward link signal to terminate is based upon the relative strengths of pilot signals corresponding to the forward links, as reported by the mobile terminal.

In determining which of the forward links to terminate, operation according to the present invention may consider the instantaneous strength of the forward link transmissions, as measured by and last reported by the mobile terminal. Such reporting of pilot signal strengths is consistent with standardized hand-off operations. With these operations, the mobile terminal has one rake of its multiple rake receivers constantly scanning active carriers for pilot signals, each of which is distinguished from other pilot signals on a same carrier by a Pseudo-Noise (PN) offset of a corresponding PN sequence. When the mobile terminal finds a pilot signal, it measures the strength of the pilot signal and determines the PN offset of the pilot signal. Then, the mobile terminal reports the strengths of the pilot signals and the corresponding PN offsets in a pilot signal strength measurement message (PSMM). The mobile terminal may send the PSMM periodically, e.g., every second, every 2 seconds, etc., or it may send this message when a threshold condition is met, e.g., when the change in relative strengths of the pilots signals exceeds a threshold. The supporting network infrastructure receives the reported pilot signal strengths and PN offsets from the mobile terminal and allocates/deallocates forward link transmissions based thereupon.

Thus, the operations of the present invention may be performed consistently with prior hand-off operations in terminating the weakest or two weakest forward link transmissions based upon the last reported pilot signal strengths. Such operations would consider the instantaneous strengths of the pilot signals, as last reported by the mobile terminal. In another operation according to the present invention, the strengths of the pilot signals are averaged over a time period based upon multiple PSMM reports from the mobile terminal. With these "averaging" operations, temporary perturbations in pilot signal strengths will be smoothed.

With particular reference to FIG. 1, when the mobile terminal is moving from position 134 to position 136, it is in six-way hand-off. During this six-way handoff operation, a Walsh code availability threshold is met and six-way hand-off is prohibited. Based on the strength of pilot signals previously reported by the mobile terminal, according to the present invention, transmissions in sector A of cell 124 and in sector B of cell 126 are terminated. After termination, the mobile terminal is in four-way hand-off.

In an alternate operation according to the present invention, the mobile terminal initiates a call to telephone 118 while at position 132. Based upon reported pilot signal strengths, the cellular wireless network would like to initiate five-way hand-off in initially servicing the call. However, because a Walsh code availability threshold had previously been met, five-way and six-way hand-off are prohibited and only four-way hand-off is serviced.

Figure 2:
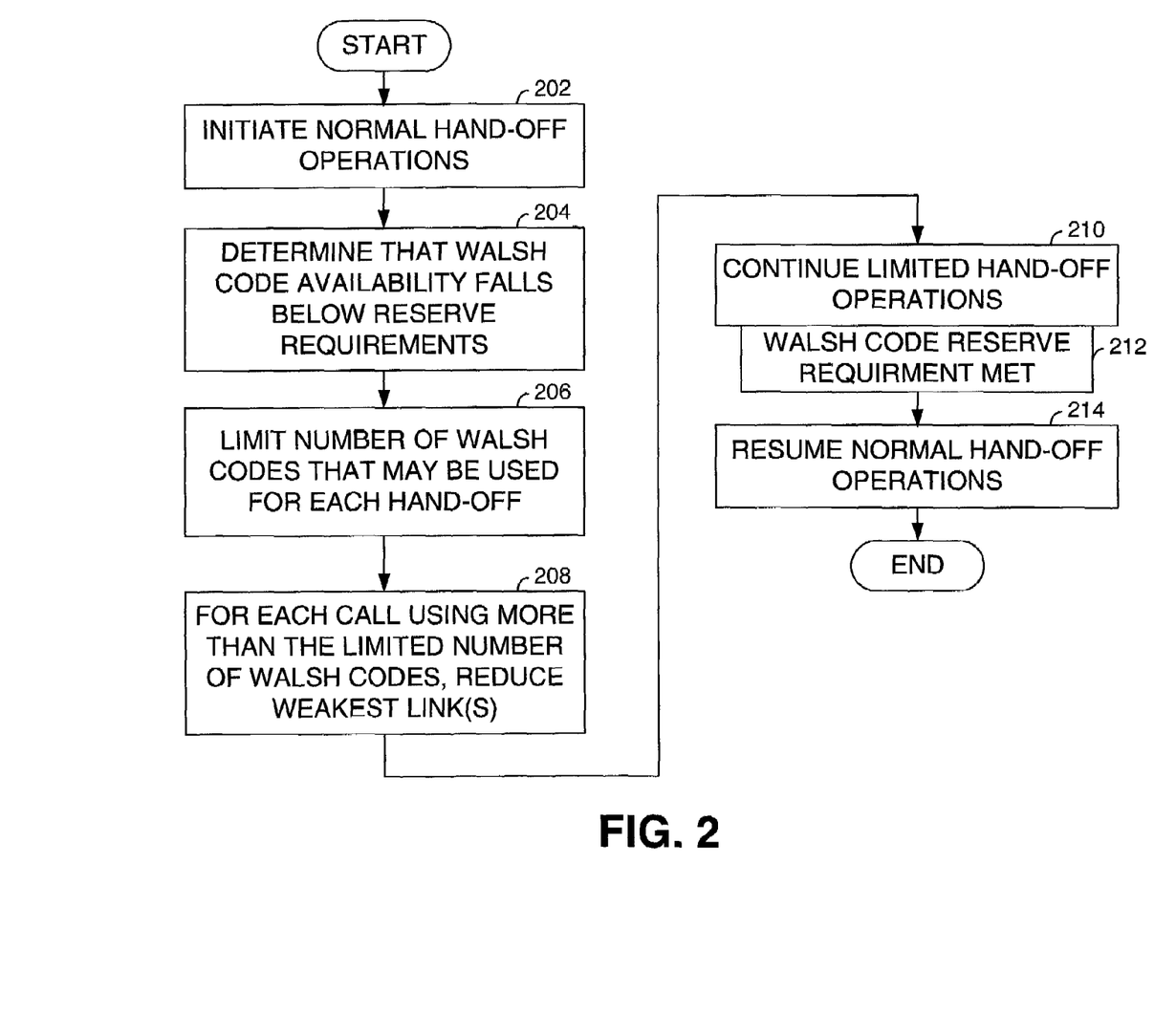
FIG. 2 is a diagram illustrating operations according to the present invention in managing Walsh code allocation and use.

FIG. 2 is a diagram illustrating operations according to the present invention in managing Walsh code allocation and use. Upon initiation of operation according to the present invention, normal hand-off operations are performed (step 202). With these normal hand-off operations, no limitation is placed on the number of cells/sectors that can participate in the hand-off of a mobile terminal. As was described with reference to FIG. 1, in one embodiment, six-way hand-off is supported.

In an operation according to the present invention, when a number of user terminals increases from a minimal level, Walsh code availability will fall below a Walsh code reserve requirement (step 204). In one embodiment of a CDMA system that operates according to the present invention, sixty-four (64) Walsh codes are available for use in each sector, with at least three Walsh codes dedicated to overhead channels. Thus, for example, with 22 mobile terminals consuming 52 Walsh codes, and with 3 Walsh codes consumed for overhead channels, a total of 55 Walsh codes are used with 9 Walsh codes remaining in reserve. With the Walsh code availability threshold (Walsh code reserve requirement) set to 10 Walsh codes, the number of available Walsh codes has fallen below the availability threshold.

With the Walsh code availability threshold met, operation according to the present invention limits the number of forward links that may be used for hand-off operations (step 206). In one particular operation, five-way and six-way hand-off operations are precluded. For each currently serviced call having being in hand-off with a number of forward links that exceeds a hand-off limit, e.g., five-way or six-way handoff, one or more of the weakest forward links for these calls are terminated (step 208). Limited hand-off operations then continue (step 210) until the Walsh code reserve requirement is met (step 212). When the Walsh code reserve requirement is met, normal hand-off operations resume (step 214).

Figure 3:
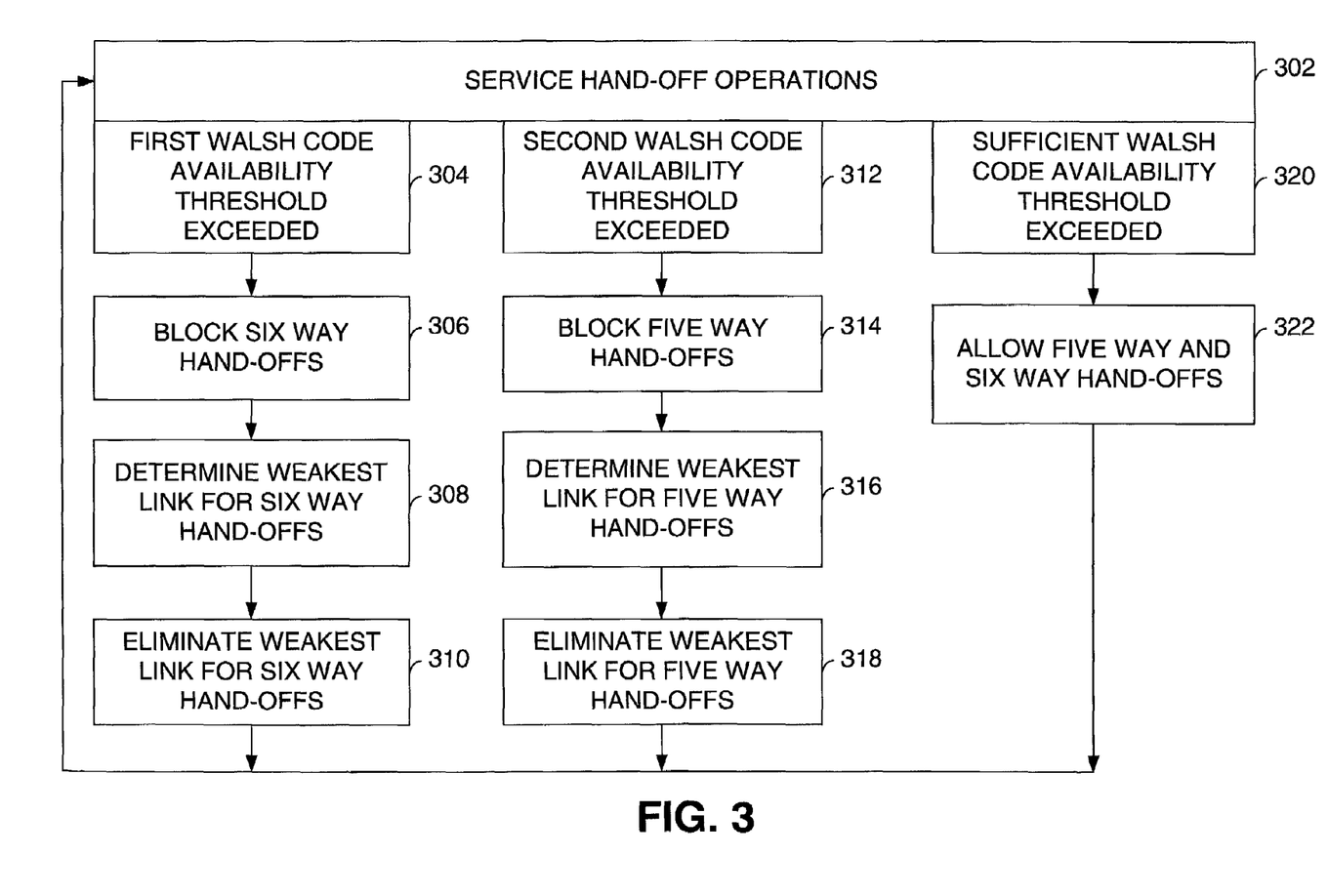
FIG. 3 is a diagram illustrating in more detail operations according to the present invention in managing Walsh code allocation and use.

FIG. 3 is a diagram illustrating in more detail operations according to the present invention in managing Walsh code allocation and use. In servicing hand-off operations, no limitation initially exists, e.g., six-way and all lesser hand-off operations are allowed (step 302). However, when a first Walsh code availability threshold limit is exceeded, e.g., 10 remaining available Walsh codes (step 304), six-way hand-off operations are blocked (step 306). When six-way hand-off operations are blocked, for those mobile terminals currently being serviced by six-way hand-off, a weakest forward link of the six transmitting sectors/cells is determined (step 308), such forward link signals are terminated, and the Walsh code used therefore is returned to the Walsh code pool (step 310). As was previously described, the strength of the forward links are determined based upon prior pilot signal strength measurement messages previously received by the cellular wireless network infrastructure from the mobile terminal. From step 310, operation returns to step 302 with hand-off limitations as indicated.

When a second Walsh code availability threshold is exceeded, e.g., 5 remaining available Walsh codes step (312), five-way hand-off operations are blocked (step 314). When five-way hand-off operations are blocked, for those mobile terminals currently being serviced by five-way hand-off, a weakest forward link of the five transmitting sectors/cells is determined (step 316), such forward link signals are terminated, and the Walsh code used therefore is returned to the Walsh code pool (step 318). From step 318, operation returns to step 302 with hand-off limitations set as indicated.

In a typical operation, the Walsh code availability threshold of step 304 would first be exceeded. Then, if the operations of steps 306 through 310 fail to provide a sufficient number of available Walsh codes, the threshold operations of step 312 may be met. When a sufficient number of Walsh codes are available, based upon a threshold that is set, e.g., 15 Walsh codes, (at step 320), five-way and six-way hand-off is then allowed (step 322). From step 322, operation returns to step 302 with normal hand-off operations allowed.

Note that different cells/sectors may have different operating conditions. For those cells/sectors that are heavily loaded, no five-way or six-way operations may be precluded. However, for those cells/sectors that are lightly loaded, five-way or six-way operations may be allowed. When some cells are hand-off limited and other cells are not hand-off limited, the cells-that are hand-off limited will provide weaker forward links even though they will provide primary forward links and stronger secondary links.

Figure 4:
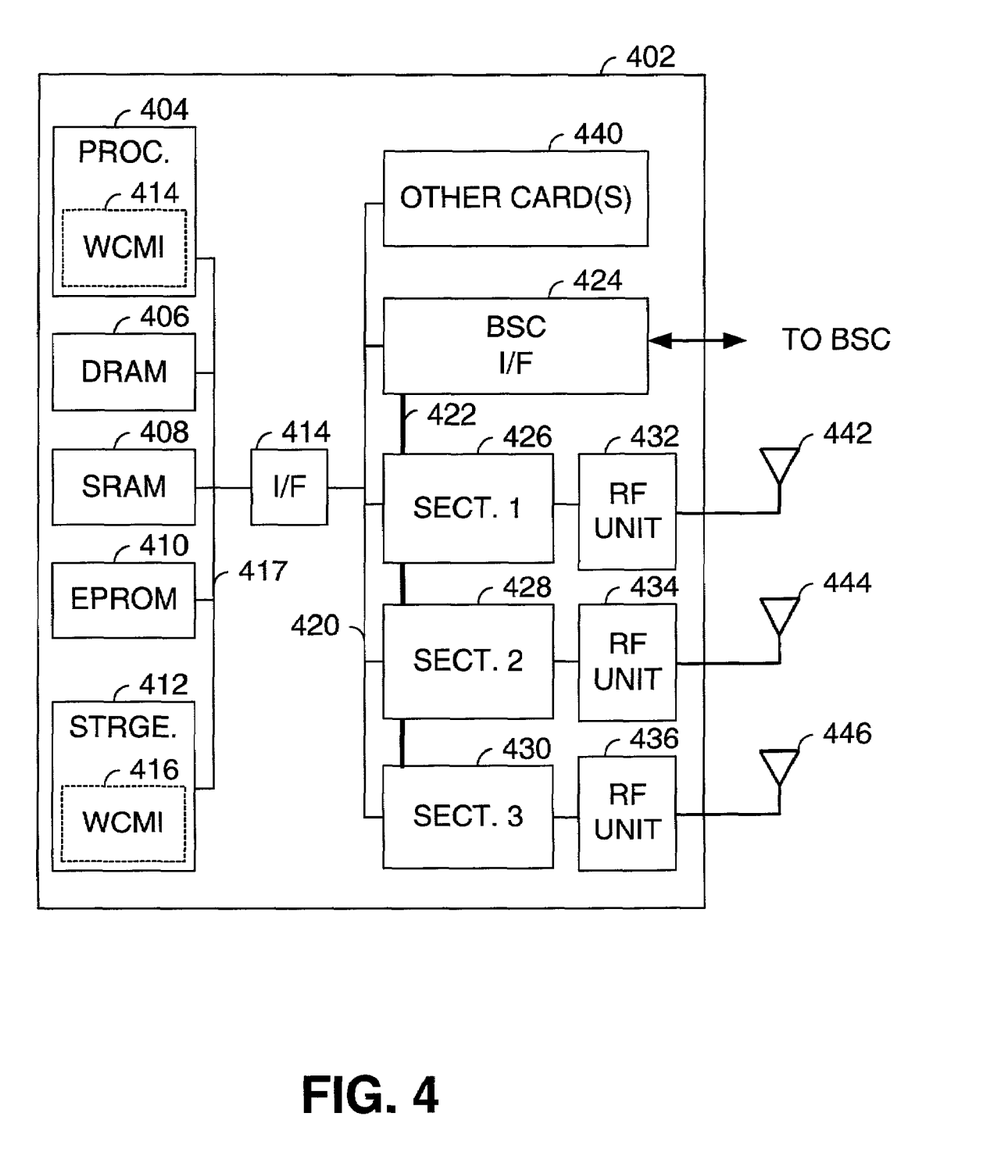
FIG. 4 is a block diagram illustrating a Base Station Transceiving Subsystem constructed according to the present invention.

FIG. 4 is a block diagram illustrating a Base Station Transceiving Subsystem (BTS) 402 constructed according to the present invention. The BTS 402 supports an operating protocol that is compatible with the teachings of the present invention, e.g., IS-95A, IS-95B, 1xRTT, 1xEV-DO, etc. The BTS 402 includes a processor 404, dynamic Random Access Memory (RAM) 406, static RAM 408, Flash memory EPROM 410 and at least one data storage device 412, such as a hard drive, optical drive, tape drive, etc. These components (which may be contained on a peripheral processing card or module) intercouple via a local bus 417 and couple to a peripheral bus 420 (which may be a back plane) via an interface 418. Various peripheral cards couple to the peripheral bus 420. These peripheral cards include a BSC interface card 424, which couples the BTS 402 to its servicing BSC.

Sector call processing cards 426, 428, and 430 couple to Radio Frequency (RF) units 432, 434, and 436, respectively. Each of these sector call processing cards 426, 428, and 430 performs digital processing for a respective sector, e.g., sector 1, sector 2, or sector 3, serviced by the BTS 402. The RF units 432, 434, and 436 couple to antennas 442, 444, and 446, respectively, and support wireless communication between the BTS 402 and mobile stations (the structure of which is shown in FIG. 4). The BTS 402 may include other cards 440 as well.

Walsh Code Management Instructions (WCMI) 416 are stored in storage 412. The WCMI 416 are downloaded to the processor 404 and/or the DRAM 406 as WCMI 414 for execution by the processor 404. While the WCMI 416 are shown to reside within storage 412 contained in BTS 402, the WCMI 416 may be loaded onto portable media such as magnetic media, optical media, or electronic media. Further, the WCMI 416 may be electronically transmitted from one computer to another across a data communication path. These embodiments of the WCMI are all within the spirit and scope of the present invention.

Upon execution of the WCMI 414, the BTS 402 performs operations according to the present invention previously described herein with reference to FIGS. 1-3. The WCMI 416 may also be partially executed by the digital processing cards 426, 428, and 430 and/or other components of the BTS 402. Further, the structure of the BTS 402 illustrated is only one of many varied BTS structures that could be operated according to the teachings of the present invention.

Figure 5:
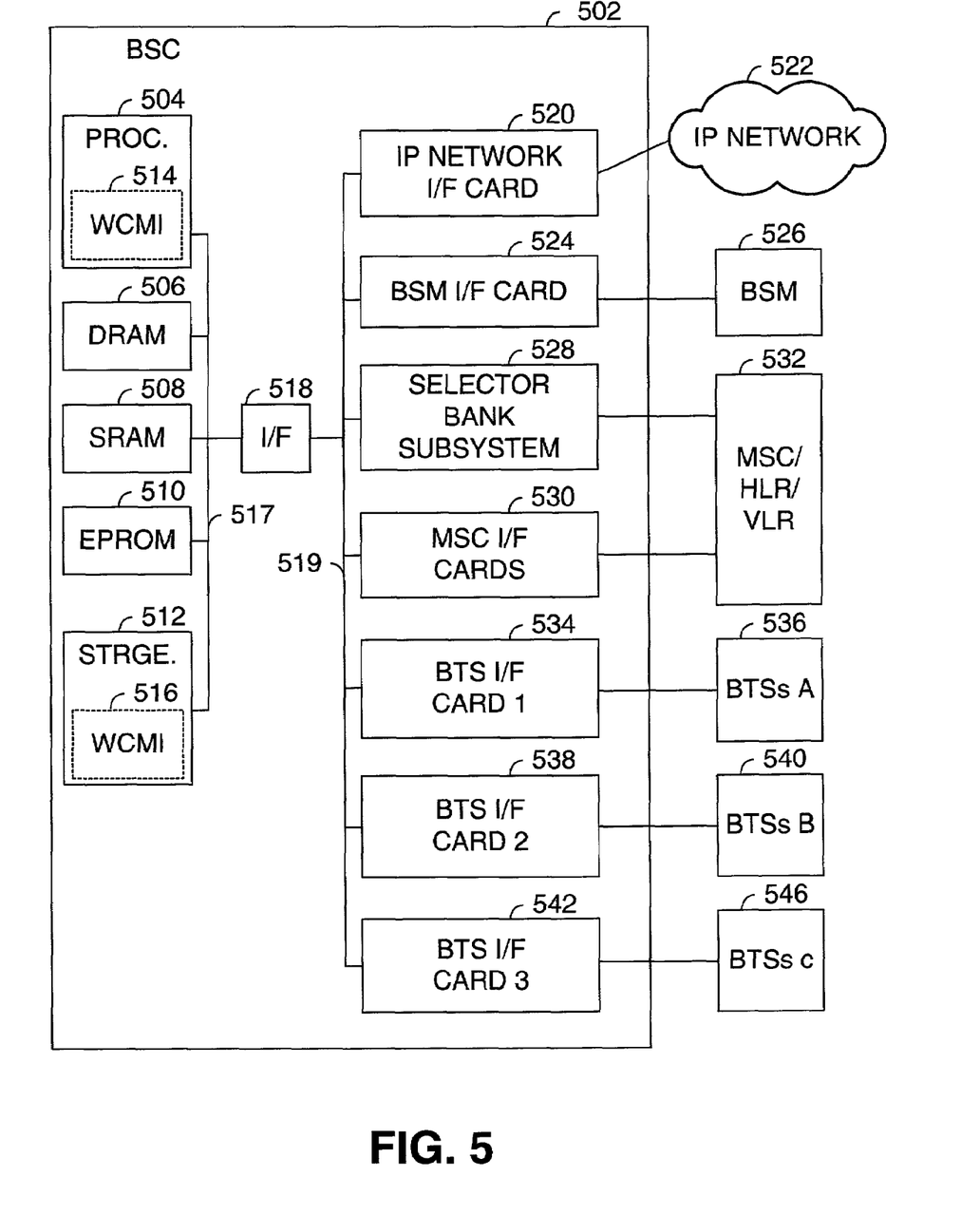
FIG. 5 is a block diagram illustrating a Base Station Controller constructed according to the present invention.

FIG. 5 is a block diagram illustrating a Base Station Controller (BSC) 502 constructed according to the present invention. The structure and operation of BSCs is generally known. The BSC 502 services both circuit switched and packet switched operations. In some cases, the BSC 502 is called upon to convert data between circuit switched and data switched formats, depending upon the types of equipment coupled to the BSC 502. The components illustrated in FIG. 5, their function, and the interconnectivity may vary without departing from the teachings of the present invention.

The BSC 502 includes a processor 504, dynamic RAM 506, static RAM 508, EPROM 510 and at least one data storage device 512, such as a hard drive, optical drive, tape drive, etc. These components intercouple via a local bus 517 and couple to a peripheral bus 519 via an interface 518. Various peripheral cards couple to the peripheral bus 519. These peripheral cards include an IP network interface card 520, a base station manager card 524, a selector band subsystem card 528, a MSC interface card 530, and a plurality of BTS interface cards 534, 538 and 542.

The IP network interface card 520 couples the BSC 502 to an IP network 522. The base station manager interface card 524 couples the BSC 502 to a Base Station Manager 526. The selector card 528 and MSC interface card 530 couple the BSC 502 to the MSC/HLR/VLR 532. the BTS interface cards 534, 538, and 542 couple the BSC 502 to base stations served by Base Station Transceiving Subsystems (BTSs) 536, 540, and 546, respectively. Walsh code management Instructions (WCMI), along with the BSC 502 hardware, enable the BSC 502 to perform the operations of the present invention. The WCMI 516 are loaded into the storage unit 512 and, upon their execution, some or all of the WCMI 514 are loaded into the processor 504 for execution. During this process, some of the WCMI 516 may be loaded into the DRAM 506. In some operations, the selector bank subsystem card 528 executes some or all of the WCMI to implement the teachings of the present invention.

In view of the above detailed description of the present invention and associated drawings, other modifications and variations will now become apparent to those skilled in the art. It should also be apparent that such other modifications and variations may be effected without departing from the spirit and scope of the present invention as set forth in the claims that follow.

The invention claimed is:

1. A method for managing Walsh Codes in a Code Division Multiple Access (CDMA) cellular wireless communication system, the method comprises:
    allocating a number of Walsh Codes in the CDMA cellular wireless communication system to a group of cell(s) or sector(s);
    setting a handoff participation limit to a maximum participation limit, where the handoff participation limit determines a maximum number of cells or sectors that may participate in handoff with any serviced mobile terminal;
    when an available number of the number of Walsh Codes becomes less than a first Walsh Code availability threshold, reducing the handoff participation limit to a first participation limit that is less than the maximum participation limit;
    when an available number of the number of Walsh Codes becomes less than a second Walsh Code availability threshold, that is less than the first Walsh Code availability threshold, reducing the handoff participation limit to a second participation limit that is less than the first participation limit; and
    for any mobile terminal participating in handoff with a number of cells or sectors that exceeds the handoff participation limit, terminating forward link transmissions from a corresponding number of servicing cell(s) or sector(s) and releasing a corresponding number of Walsh Code(s).

2. The method of claim 1, wherein terminating forward link transmissions from a corresponding number of servicing cell(s)/sector(s) and releasing a corresponding number of Walsh Code(s) further comprises:
    determining a weakest forward link serviced by a weakest cell or sector; and
    terminating the weakest forward link serviced by the weakest cell or sector.

3. The method of claim 2, wherein the weakest forward link is determined based upon the strength of corresponding pilot signals, as measured and reported by the mobile terminal.

4. The method of claim 3, wherein a plurality of reports of pilot signal strengths are used in conjunction with averaging operations to determine the weakest forward link.

5. The method of claim 1, wherein terminating forward link transmissions from a corresponding number of servicing cell(s)/sector(s) and releasing a corresponding number of Walsh Code(s) further comprises:
    terminating a weakest forward link when the mobile terminal is in five-way hand-off; and
    terminating two weakest forward links when the mobile terminal is in six-way hand-off.

6. A base station controller that supports Code Division Multiple Access (CDMA) operations for a group of cells or sectors, the base station controller comprises:
    a Mobile Switching Center (MSC) interface that interfaces the base station controller to a MSC; at least one base station interface that interface the base station controller to a plurality of base stations; and
    at least one digital processor coupled to the base station interface and to the MSC interface; and
    a plurality of software instructions that are executed by the processor, the plurality of software instructions include:
        software instructions that, upon execution by the processor, cause the base station controller to allocate a number of Walsh Codes in the CDMA cellular wireless communication system to the group of cells or sectors;
        software instructions that, upon execution by the processor, cause the base station controller to set a handoff participation limit to a maximum participation limit, where the handoff participation limit determines a maximum number of cells or sectors that may participate in handoff with any serviced mobile terminal;
        software instructions that, upon execution by the processor, cause the base station controller to, when an available number of the number of Walsh Codes becomes less than a first Walsh Code availability threshold, reduce the handoff participation limit to a first participation limit that is less than the maximum participation limit;
        software instructions that, upon execution by the processor, cause the base station controller to, when an available number of the number of Walsh Codes becomes less than a second Walsh Code availability threshold, that is less than the first Walsh Code availability threshold, reduce the handoff participation limit to a second participation limit that is less than the first participation limit; and
        software instructions that, upon execution by the processor, cause the base station controller to, for any mobile terminal participating in handoff with a number of cells or sectors that exceeds the handoff participation limit, terminate forward link transmissions from a corresponding number of servicing cell(s) or sector(s) and releasing a corresponding number of Walsh Code(s).

7. The base station controller of claim 6, wherein in terminating forward link transmissions from a corresponding number of servicing cell(s)/sector(s) and releasing a corresponding number of Walsh Code(s), the base station controller determines a respective weakest forward link for the mobile terminal and terminates the respective weakest forward link.

8. The base station controller of claim 7, wherein the base station controller determines the respective weakest forward link based upon the strength of corresponding pilot signals, as measured and reported by the mobile terminal.

9. The base station controller of claim 8, wherein a plurality of reports of pilot signal strengths are used in conjunction with averaging operations to determine the weakest forward link.

10. The base station controller of claim 6, wherein the base station controller operates consistent with at least one of IS-95A, IS-95B, 1xRTT and 1xEV-DO operating standards.

* * * * *